US009427910B2

(12) United States Patent
Ando et al.

(10) Patent No.: US 9,427,910 B2
(45) Date of Patent: Aug. 30, 2016

(54) MANUFACTURING METHOD OF DESIGN MEMBER AND THREE-DIMENSIONAL TRANSFERRING TOOL

(71) Applicant: TOYODA GOSEI CO., LTD, Kiyosu-shi, Aichi-ken (JP)

(72) Inventors: Sadanori Ando, Kiyosu (JP); Tatsuo Ito, Kiyosu (JP)

(73) Assignee: TOYODA GOSEI CO., LTD, Aichi-pref. (JP)

( * ) Notice: Subject to any disclaimer, the term of this patent is extended or adjusted under 35 U.S.C. 154(b) by 277 days.

(21) Appl. No.: 14/058,519

(22) Filed: Oct. 21, 2013

(65) Prior Publication Data
US 2014/0130976 A1 May 15, 2014

(30) Foreign Application Priority Data

Nov. 9, 2012 (JP) ................. 2012-247223

(51) Int. Cl.
| B29C 63/02 | (2006.01) |
| B29C 63/04 | (2006.01) |
| B44C 1/165 | (2006.01) |
| B44C 1/17 | (2006.01) |
| B29C 63/00 | (2006.01) |
| B32B 37/10 | (2006.01) |
| B30B 5/02 | (2006.01) |

(52) U.S. Cl.
CPC ........... B29C 63/0073 (2013.01); B32B 37/10 (2013.01); B44C 1/172 (2013.01); B32B 2309/12 (2013.01); B32B 2309/60 (2013.01); Y10T 156/1002 (2015.01); Y10T 156/1028 (2015.01)

(58) Field of Classification Search
CPC .................. Y10T 156/1002; Y10T 156/1028; B29C 63/0073; B32B 37/10; B32B 2309/60; B32B 2309/12; B44C 1/172; B30B 5/02

USPC .......................... 156/381, 382, 242, 247, 277
See application file for complete search history.

(56) References Cited

U.S. PATENT DOCUMENTS

| 2,112,384 | A | * | 3/1938 | Sloan | A42C 1/04 2/175.9 |
| 3,654,012 | A | * | 4/1972 | Schlager | B29C 51/16 156/212 |
| 4,587,155 | A | * | 5/1986 | Durand | B41F 16/00 400/490 |
| 4,668,239 | A | * | 5/1987 | Durand | B41F 16/00 156/230 |
| 4,670,084 | A | * | 6/1987 | Durand | B41F 17/006 100/322 |
| 4,795,517 | A | * | 1/1989 | Elliott | B29C 44/569 156/221 |
| 5,641,372 | A | * | 6/1997 | Okuno | B41F 16/00 156/230 |

(Continued)

FOREIGN PATENT DOCUMENTS

JP 01-283199 A 11/1989

Primary Examiner — Sonya Mazumdar
(74) Attorney, Agent, or Firm — Posz Law Group, PLC

(57) ABSTRACT

Provided is a manufacturing method that is able to manufacture a design member superior in a design property. In a manufacturing method of a design member for transferring a decorative layer onto a design surface of a base body, the manufacturing method provides a recessed parting groove that is formed in at least a part of a border between a general surface and the design surface, arranges the base body in a chamber having a gas pressure adjusting device, places a transfer film on the design surface of the base body, and, with changing a gas pressure in the chamber by the gas pressure adjusting device to crimp the transfer film onto the design surface, presses the transfer film against the design surface under a heated state by a three-dimensional transferring tool made of an elastic body.

15 Claims, 6 Drawing Sheets

(56) References Cited

U.S. PATENT DOCUMENTS

| | | | | |
|---|---|---|---|---|
| 5,908,524 A * | 6/1999 | Masui | ................... | B29C 51/082 |
| | | | | 156/212 |
| 6,982,021 B2 * | 1/2006 | Spengler | ............... | B29C 43/203 |
| | | | | 156/221 |
| 7,504,061 B2 | 3/2009 | Kondo | | |
| 2005/0056363 A1 * | 3/2005 | Takeyama | ............... | B32B 37/10 |
| | | | | 156/212 |
| 2006/0231983 A1 * | 10/2006 | Kondo | ................ | B29C 37/0025 |
| | | | | 264/510 |
| 2010/0084083 A1 * | 4/2010 | Hull | ....................... | A43D 95/14 |
| | | | | 156/235 |
| 2013/0255877 A1 * | 10/2013 | Wu | ..................... | B32B 37/1018 |
| | | | | 156/272.2 |

\* cited by examiner

MANUFACTURING METHOD OF DESIGN MEMBER AND THREE-DIMENSIONAL TRANSFERRING TOOL

BACKGROUND OF THE INVENTION

1. Technical Field

The present invention relates to an art for transferring a decorative layer on a three-dimensional design surface.

2. Background Art

There have been techniques for providing a three-dimensional design surface on a base body of a design member and plating a decorative layer on the design surface in order to provide a three-dimensional design to the design member. The decorative layer may be directly plated on the design surface, for example. Alternatively, a separate design member from the base body is provided, a three-dimensional decorative layer is plated, and the design member may be integrated into the base body. Also in this case, the design member having the three-dimensional decorative layer plated on the base body can be obtained.

In the case where the decorative layer is plated as mentioned above, an attractive three-dimensional decorative layer may be formed, and the design member that is superior in a design property can be obtained. In the case where the decorative layer may be plated, however, there is a problem that it will be difficult to reduce the manufacturing cost, because the product weight will increase and the mask process and the like will be necessary.

There has been a technique of using a transfer film and transferring the decorative layer onto the planer design surface (see Patent documents 1 and 2, for example). There has been a general transfer film, in which a transfer layer containing a decorative layer and a adhesive layer is laminated on the base film. Pressuring this type of transfer film against the design surface allows the decorative layer on the base film to be transferred onto the design surface. As a specific process, first, the adhesive layer contained in the transfer layer is heated to be softened or melted. Under this state, pressuring the transfer layer against the design surface causes the decorative layer contained in the transfer layer to be adhered onto the design surface by the adhesive layer. According to this process, it is considered that the manufacturing cost may be reduced compared to the case where the decorative layer is plated.

However, the general transfer film is of a planar type. Therefore, when the decorative layer is transferred onto the three-dimensionally shaped (that is, three-dimensional) design surface, it is necessary to fit the transfer film along the three-dimensional design surface. In fitting the planar transfer layer along the three-dimensional design surface, however, there is a case of causing the transfer layer to wrinkle or crack therein, which makes it difficult to obtain the design member having a superior design property.

Further, in order to evenly transfer the decorative layer to the entire decoration surface, the transfer film is required to be pressed hard against the entire design surface. However, when the design surface has a three-dimensional shape, for example, and the transfer film is pressed in one direction, while it is easy to cause the pressing force to work on the surface which is vertical to the pressing direction, it is difficult to cause the pressing force to work on the surface which is parallel to the pressing direction. Therefore, it is quite difficult to form the decorative layer with leas unevenness by the transferring, and the parting portion between the decorative layer and the portion other than the decorative layer on the base body is likely to be irregular. In other words, when the design surface of the base body has a three-dimensional shape, the parting property between the decorative layer and the portion other than the decorative layer is likely to be degenerated, which makes it difficult to obtain the design member superior in a design property.

REFERENCE LIST

Patent Documents

Patent document 1: Japanese Patent Application Laid-open Publication No. H1-283199

Patent document 2: Published Japanese Translation of PCT International Publication for Patent Application No. 2005-524557

SUMMARY OF THE INVENTION

The present invention has been made in addressing the above circumstances and is no provide a manufacturing method that is able to manufacture the design member superior in a design property.

A manufacturing method of a design member of the present, invention that addresses the above objects is a manufacturing method of a design member for transferring a decorative layer, out of a base body having a three-dimensional design surface and a general surface that is a surface other than the design surface, onto the design surface, the manufacturing method including:

with using the base body comprising, in the general surface, a recessed parting groove that is formed in at least a part of a border to the design surface, a preparing step for arranging the base body in a chamber having a gas pressure adjusting device, placing, on the design surface of the base body, a transfer film in which a transfer layer including an adhesion layer and the decorative layer is laminated on a film base material, and changing a gas pressure in the chamber by the gas pressure adjusting device to crimp the transfer film onto the design surface; and a heat transferring step for, with crimping the transfer film onto the design surface by the gas pressure adjusting device, pressing the transfer film against the design surface under a heated state by a three-dimensional transferring tool comprising an elastic body.

The manufacturing method of the design member of the present invention preferably includes any one of the following (1) to (4), and more preferably includes a plurality of the following (1) to (4):

(1) The three-dimensional transferring tool is able to move forward and backward with respect to the design surface of the base body and has a pressing surface facing the design surface, a peripheral edge of the pressing surface is formed with a pressing complement surface continuing from the pressing surface and extending up to a position facing at least a part of the parting groove, and the pressing complement surface rises toward a moving direction with respect to the design surface compared to a tangent at an end of the pressing surface.

(2) The gas pressure adjusting device includes a decompressing pump adapted, to reduce a gas pressure in the chamber below an atmospheric pressure in the heat transferring step.

(3) It includes a pre-heating step for heating the transfer film after the preparing step and before the heat transferring step, (4) A heating temperature in the pre-heating step is lower than a heating temperature in the heat transferring step.

A three-dimensional transferring tool of the present invention that addresses the above objects is a three-dimensional transferring tool in a use of the manufacturing method of the design member according to claim 1, the three-dimensional transferring tool comprising an elastic body, being able to move forward and backward with respect to the design surface of the base body, and having a pressing surface facing the design surface, wherein a peripheral edge of the pressing surface is formed with a pressing complement surface continuing from the pressing surface and extending up to a position facing at least a part of the parting groove, and wherein the pressing complement surface rises toward a moving direction with respect to the design surface compared to a tangent at an end of the design surface.

According to the manufacturing method of the design member of the present invention, the transfer layer is fitted to the three-dimensional design surface by crimping or pressing the transfer film onto the design surface of the base body by the gas pressure. Further, under the heated state, the transfer film is pressed along the design surface by the three-dimensional transferring tool made of the elastic body. Therefore, while being softened, the transfer film is shaped along the three-dimensional design surface. That is, according to the manufacturing method of the design member of the present invention, the transfer film and the transfer layer on the transfer film can be the three-dimensional shape corresponding to the design surface, so that the occurrence of the wrinkles and the crack in the transfer layer can be suppressed.

Further, in the manufacturing method of the design member of the present invention, a member made of an elastic body is used for the tool for the pressing (three-dimensional transferring tool). The three-dimensional transferring tool is able to be elastically deformed and thus presses the transfer film while being elastically deformed, into the shape along the design surface of the base body. Therefore, this tool is able to apply a sufficient pressing force even in the direction in which it is generally considered to be difficult to cause the pressing force to work (in the direction substantially parallel to the pressing force, for example). Therefore, the manufacturing method of the design member of the present invention allows the decorative layer to be transferred onto the design surface without unevenness (or, substantially without unevenness).

Further, a recessed parting groove is provided to the border between the general surface and the design surface in the base body. Therefore, in at least the portion to which the parting groove is provided, the end of the transfer layer can be disposed in the parting groove. Since the parting groove has a concave shape, the end of the transfer layer located on the parting groove is unlikely to be seen from outside. Thus, even if the parting portion between the decorative layer and the portion other than the decorative layer on the base body is irregular, for example, the design member exhibits a superior design.

According to the manufacturing method of the design member of the present invention, the cooperation of the above allows for the relatively easier manufacturing of the design member that is superior in a design property, in particular, in a parting property.

Further, the three-dimensional transferring tool of the present invention allows for the manufacturing of the design member that is superior in a design property (including a parting property).

DETAILED DESCRIPTION OF THE EMBODIMENT

A manufacturing method of a design member and a tool of the present invention will be described below by referring to the specific examples. It is noted that, unless otherwise noted, the manufacturing method of the design member of the present invention is simply referred to as the manufacturing method of the present invention, and the design member obtained by the manufacturing method of the present invention is simply referred to as the design member.

(Embodiment 1)

Figure 1:
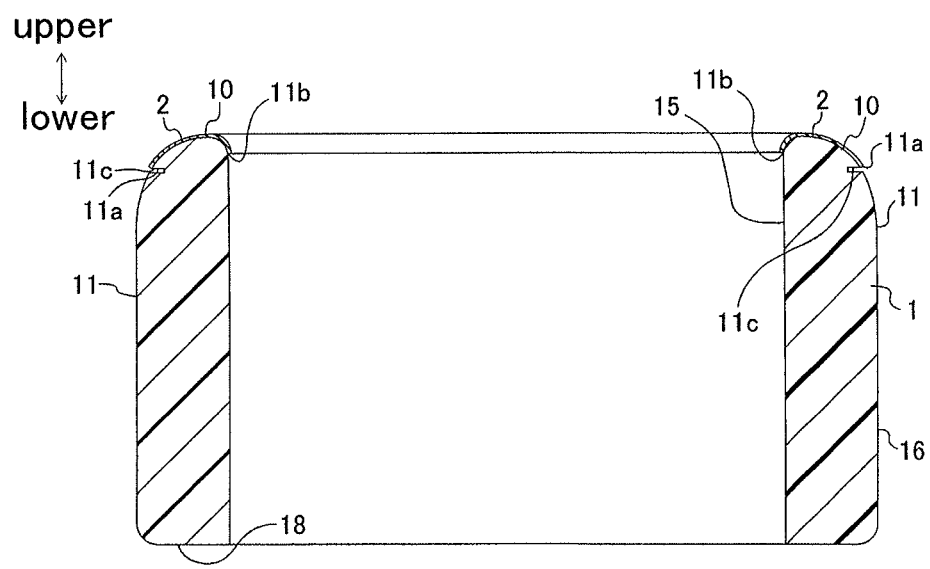
FIG. 1 is a cross-sectional diagram schematically illustrating a design member manufactured by a manufacturing method of the design member of an embodiment 1, in particular, schematically illustrating a cross section when a substantially cylindrical design member of the embodiment 1 is cut in the axial direction.
Figure 2:
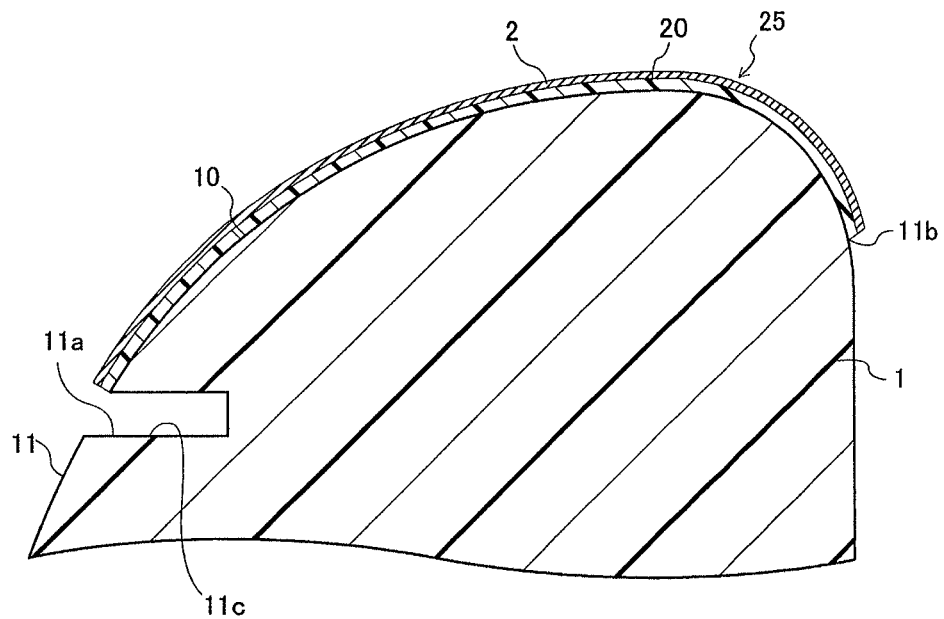
FIG. 2 is an enlarged view of a main part of FIG. 1.
Figure 3:
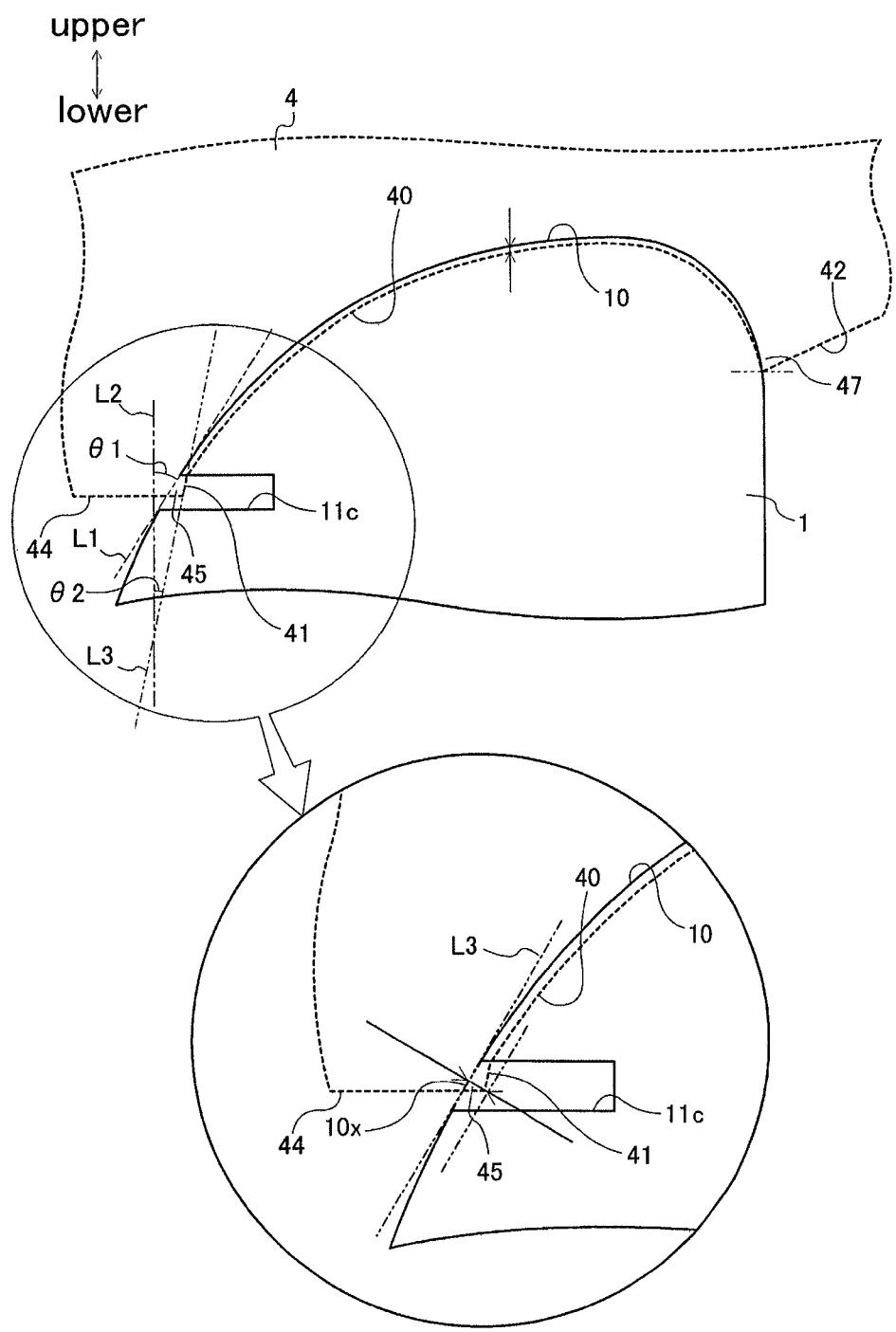
FIG. 3 is an explanatory diagram, schematically illustrating a base body and three-dimensional transferring tool used in the manufacturing method of the design member of the embodiment 1.
Figure 4:
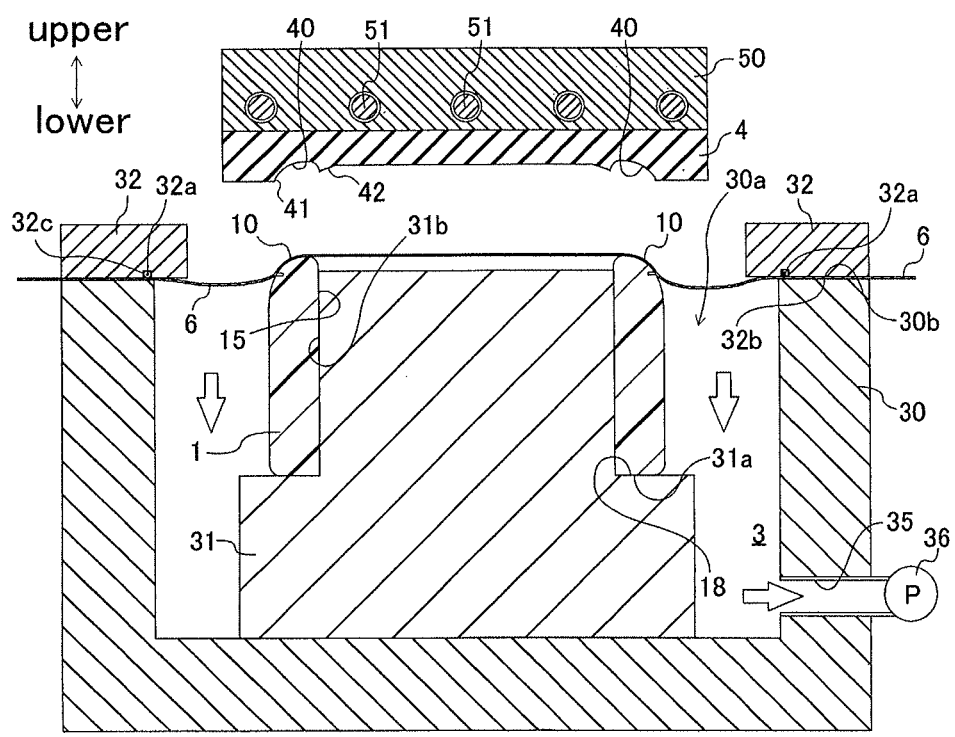
FIG. 4 is an explanatory diagram schematically illustrating a preparing process in the manufacturing method of the design member of the embodiment 1.
Figure 5:
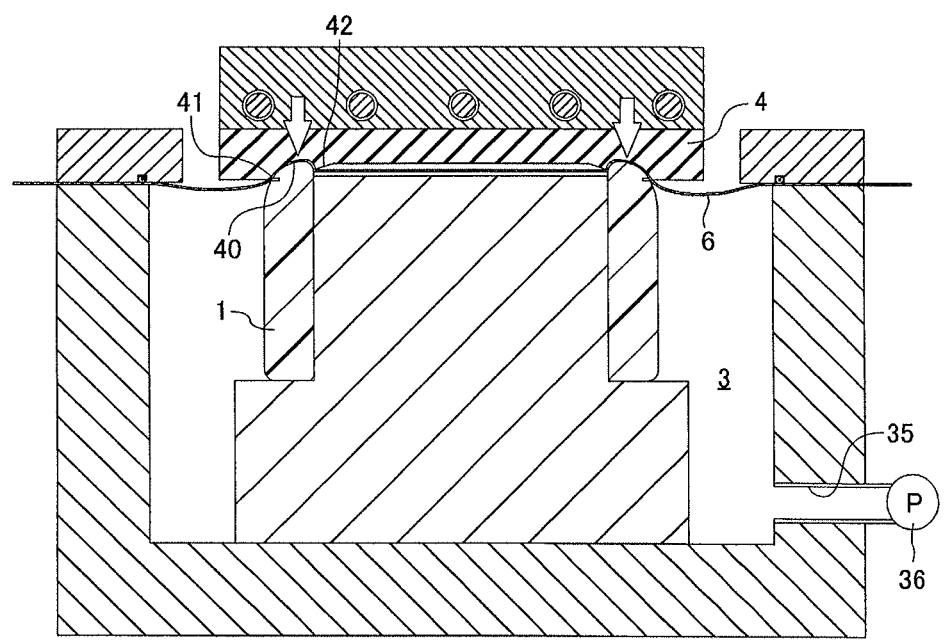
FIG. 5 is an explanatory diagram schematically illustrating a heat transferring process in the manufacturing method of the design member of the embodiment 1.
Figure 6:
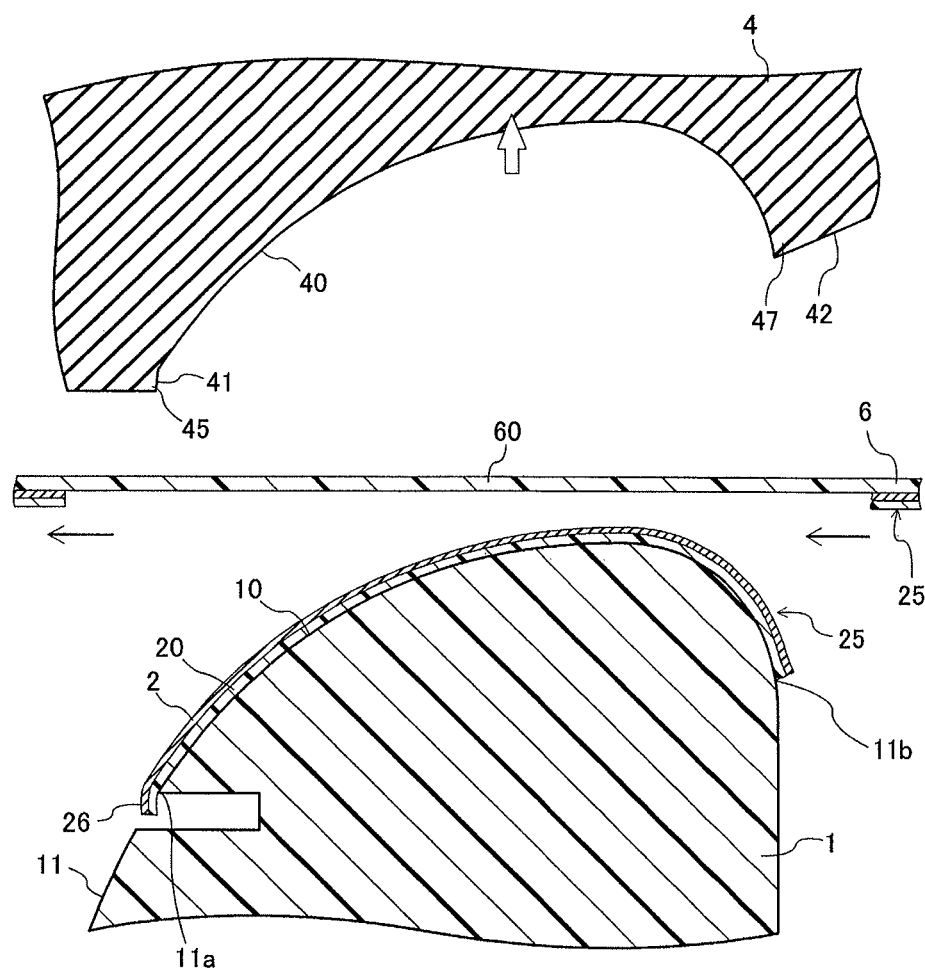
FIG. 6 is an explanatory diagram schematically illustrating a heat transferring process in the manufacturing method of the design member of the embodiment 1.

The design member of the embodiment 1 is a retainer member of an air conditioner register for a vehicle. Thus, the manufacturing method of the embodiment 1 is an example that embodies the manufacturing method of the present invention as a method for manufacturing the retainer member used for the air conditioner register. FIG. 1 illustrates a cross-sectional diagram, schematically illustrating the design member obtained by the manufacturing method of the embodiment 1. FIG. 2 is an enlarged view of the main part (in particular, an enlarged view around the deign surface) of FIG. 1. FIG. 3 is an explanatory diagram, schematically illustrating a base body and a three-dimensional transferring tool used in the manufacturing method of the embodiment 1. FIG. 4 to FIG. 6 are explanatory diagrams schematically illustrating the manufacturing method of the design member of the embodiment 1. In particular, FIG. 4 schematically illustrates the preparing process, FIG. 5 schematically illustrates an initial stage of the heat transferring process, and FIG. 6 schematically illustrates an end stage of the heat transferring process. Below, the upper and the lower in the embodiment represent the upper and the lower indicated in FIG. 1.

The design member to be manufactured by the manufacturing method of the embodiment 1 has a base body 1 and a decorative layer 2 formed on the base body 1 as illustrated in FIG. 1. The base body has substantially a cylindrical shape. The base body 1 has a design surface 10 and a general surface 11. The design surface 10 configures one end surface (the upper surface in FIG. 1) in the axial direction of the base body 1, and has substantially a ring shape coaxial to the base body 1. It is noted that the design surface 10 has a three-dimensional shape rising upward. In other words, the design surface 10 is a curved surface. The general surface 11 is other surface than the design surface 10 in the base body 1.

The borders between the general surface 11 and the design surface 10 are formed in the inner circumference of the design surface 10 (that is, the inner side in the radial direction of the design surface 10, the inner surface 15 side of the base body 1) and the outer circumference of the design surface 10 (that is, the outer side in the radial direction of the design surface 10, the outer surface 16 side of the base body 1), respectively. The borders of the general surface 11 to the design surface 10 are formed in the inner circumference side and the outer circumference side of the design surface 10 and have a ring shape, respectively. In the border of the general surface 11 to the design surface 10, the part formed in the outer circumference side of the design surface 10 is referred to as a first boundary part 11a and the part formed in the inner circumference side of the design surface 10 is referred to as a second boundary part 11b. The first boundary part 11a forms a surface of a recessed parting groove 11c. On the other hand, the second boundary part 11b continues smoothly from the design surface 10.

The decorative layer 2 is made of a metal (chrome) layer. As illustrated in FIG. 2, an adhesive layer 20 is interposed between a decorative layer 2 and a base body 1, and a transparent protective layer (not shown) is laminated on the decorative layer 2. As the material of the adhesive layer, a general adhesive agent may be used, and, for example, at least one type of the adhesive agent selected from poly-amide, EVA (ethylene-vinyl acetate copolymerization resin), polyolefin, polyurethane, polyester and synthetic rubbers may be used. Among the above, the acrylic adhesive agent is preferably used, in particular. Further, as the material of the transparent protective layer, at least one type selected from acrylic, acrylic urethane, polyolefin resin materials, and the like may be used. Among the above, the acrylic resin material is preferably used, in particular.

The design member of the embodiment 1 is manufactured by the manufacturing method of the embodiment 1 illustrated below.

(Preparing Process)

First, the cylindrical base body 1 as described above was prepared, The base body 1 in the manufacturing method of the embodiment 1 is made of polycarbonate and has the design surface 10 and the general surface 11 as described above. Next, as illustrated in FIG. 4, the base body 1 is arranged inside a chamber 3 with the design surface 10 facing upward. Any material may be applied to the base body 1. For example, at least one type selected from general resin materials such as polycarbonate, polycarbonate/acry-lonitrile-butadiene-styrene (PC/ABS) resin, acrylonitrile-butadiene-styrene (ABS) resin, and acrylonitrile/ethylene-propylene-diene-styrene (AES) resin.

The chamber 3 is partitioned and formed with a partition wall portion 30 opened upward and having a box shape, a supporting tool 31 arranged inside the partition wall portion 30, a clamp frame 32 disposed on the upper side of the partition wall portion 30, and a three-dimensional transfer-ring tool 4 that has substantially the plate shape, faces an opening 30a of the partition wall portion 30, and is disposed over the clamp frame 32.

The partition wall portion 30 is provided with a bent hole 35, and the bent hole 35 is connected to a decompression pump 36. The bent hole 35 and the decompression pump 36 correspond to the gas pressure adjusting device in the manufacturing method of the present invention. It is noted that the gas pressure adjusting device in the manufacturing method of the present invention is not limited to the above, and it may be the one as long as a transfer film 6 described later can be crimped onto the design surface 10 of the base body 1 by changing the gas pressure in the chamber 3.

The supporting tool 31 is made of steel and has substantially a columnar shape having a bottom supporting surface 31a that has the shape corresponding to a bottom surface 18 of the base body 1 and a side supporting surface 31b that has the shape corresponding to an inner circumference surface 15 of the base body 1.

The clamp frame 32 is made of steel, and has substantially a frame shape having a second clamping surface 32b facing the upper surface (first clamping surface 30b) of the partition wall, portion 30. The second clamping surface 32b has a ring holding groove 32a extending in. the circumferential direction recessed therein. The ring holding groove 32a has an O-ring 32c attached thereto.

The three-dimensional transferring fool 4 is made of rubber (the degree of rubber hardness is approximately 40 degrees to 90 degrees), and has a pressing surface 40 with the concave and convex shape corresponding to the design surface 10 of the base body 1 as described later. The entire three-dimensional transferring tool 4 is preferably made of elastic body. However, only the part including the pressing surface 40 in the three-dimensional transferring tool 4 may be made of the elastic body. In the manufacturing method of the embodiment 1, the three-dimensional transferring tool 4 is held in a steel base tool 50, A heater 51 is embedded in the base tool 50. The heater 51 is able to be heated by the power supply from a not-shown power source. The heater 51 is a heat source adapted to heat the three-dimensional transfer-ring tool 4. It is noted that the heating temperature of the heater 51 is preferably approximately 190 to 230 degrees centigrade, and it is approximately 200 degrees centigrade in the embodiment. The base tool 50 is held by a not-shown driving device. The driving device moves the base tool 50 back and forth toward the design surface 10 (upward and downward in FIG. 4).

In response that the base tool 50 and the three-dimensional transferring tool 4 held by the base tool 50 are moved upward by the driving device, the inside of the chamber 3 is exposed. Under this state, the clamp frame 32 is further moved upward to mount the base body 1 to the supporting tool 31. In response, the bottom surface 18 of the base body 1 comes into contact with the bottom supporting surface 31a of the supporting tool 31, the inner circumference surface 15 of the base body 1 comes into contact with a side supporting surface 31b of the supporting tool 31, and the base body 1 is held by the supporting tool 31.

Next, the transfer film 6 is placed on the design surface 10 of the base body 1. The transfer film 6 has a multi-layered structure. In the layers of the transfer film 6, a film base material 60, a mold release layer (not-shown), a transparent protective layer (not-shown), the decorative layer 2, and the adhesive layer 20 are laminated in this order. The transfer film 6 is placed on the design surface 10 with the adhesive layer 20 facing the design surface 10.

The film base material 60 is made of polyester (specifically, polyethylene-terephthalate: PET). The mold release layer is made of acrylic resin. The transparent protective layer, the decorative layer 2, and the adhesive layer 20 have been described above. The mold release layer, the transpar-ent protective layer, the decorative layer 2, and the adhesive layer 20 compose a transfer layer 25. One end of the transfer film 6 is wound around a not-shown winding reel, and the other end is wound around a not-shown feeding reel. The transfer film 6 is continuously supplied from the right side to the left side in FIG. 4 by the winding reel and the feeding reel. It is noted that the film base material 60 and the mold release layer are not limited to the above and various types of them may be used.

The clamp frame 32 is moved downward, and the transfer film 6 is clamped by the first clamping surface 30*b* of the partition wall portion 30 and the second clamping surface 32*b* of the clamp frame 32. As described above, since the O-ring 32*c* is mounted to the ring holding groove 32*a* formed in the second clamping surface 32*b* of the clamp frame 32, the first clamping surface 30*b* and the second clamping surface 32*b* clamp the transfer film 6 in an airtight manner. As illustrated in FIG. 4, the clamp frame 32 is disposed in the outside in the radial direction (in the outer circumference side) of the base body 1 held by the supporting tool 31. Therefore, the first clamping surface 30*b* and the second clamping surface 32*b* clamp the transfer film 6 in the outside in the radial direction of the design surface 10. Then, with the first clamping surface 30*b* and the second clamping surface 32*b* clamping the transfer film 6, the decompression pump 36 is driven to reduce the pressure in the chamber 3 to be substantially vacuum. Then, as illustrated in FIG. 4, the transfer film 6 is drawn downward. Since the design surface 10 of the base body 1 is arranged under the transfer film 6, the transfer film 6 is crimped onto the design surface 10.

(Heat Transferring Process)

As described above, with the transfer film 6 being crimped onto the design surface 10, the three-dimensional transferring tool 4 is moved downward by the driving device. Since the three-dimensional transferring tool 4 has the pressing surface 40 facing the design surface 10, the three-dimensional transferring tool 4 that has been moved downward comes into contact with the transfer film 6 placed on the design surface 10. As illustrated in FIG. 3 and FIG. 5, a pressing complement surface 41 is formed in the outer peripheral edge of the pressing surface 40 in the three-dimensional transferring tool 4. As illustrated in FIG. 3, the pressing complement surface 41 continues from the pressing surface 40 and extends outward in the radial direction of the pressing surface 40. The end of the outer circumference of the pressing complement surface 41 faces substantially the center of the width direction of the parting groove 11*c*. The inclination angle of the pressing complement surface 41 is larger than the inclination angle of the pressing surface 40. Specifically, compared to the line (the tangent L1) that comes into contact with the end of the pressing complement surface 41 side of the pressing surface 40, the pressing complement surface 41 rises toward the moving direction (the up-down direction) of the three-dimensional transferring tool 4 with respect to the design surface 10. Further, in other words, assuming that the line directed to the moving direction of the three-dimensional transferring tool 4 with respect to the design surface 10 is the line L2 and that the line coming into contact with the pressing complement surface 41 is the tangent L3, the angle θ2 formed by the line L2 and the tangent L3 is smaller than the angle θ1 formed by the tangent L1 and the line L2.

On the other hand, a pressing clearance surface 42 is formed in the inner peripheral edge of the pressing surface 40 in the three-dimensional transferring tool 4. The pressing clearance surface 42 continues from the pressing surface 40 and extends inward in the radial direction of the pressing surface 40. Compared to the pressing surface 40, the pressing clearance surface 42 is offset to the rear side (upward in FIG. 3) in the moving direction of the three-dimensional transferring tool 4 with respect to the design surface 10. Therefore, the pressing clearance surface 42 does not substantially come into contact with the transfer film 6.

Furthermore, as illustrated in FIG. 3, the three-dimensional transferring tool 4 moves up to the forward position where it presses the transfer film 6 against the design surface 10. The pressing surface 40 is designed so as to overlap the design surface 10 at the frontside-backside direction of the base body 1 when the three-dimensional transferring tool 4 has moved to the forward position. The frontside-backside direction, of the base body 1 represents the direction orthogonal to the tangent L3 in the design surface 10 of the base body 1 as illustrated in the enlarged view of FIG. 3.

The amount of the overlapping of the pressing surface 40 and the design surface 10 is approximately 0.2 to 0.5 mm. The amount of the overlapping of the pressing surface 40 and the design surface 10 is the maximum at the end of the pressing complement surface 41 side in the pressing surface 40. Further, the amount of the overlapping of an extending plane 10*x* (a virtual plane formed on the parting groove lie) of the design surface 10 and the pressing complement surface 41 is approximately 0.5 to 1.0 mm, which is larger than the amount of the overlapping of the pressing surface 40 and the design surface 10. Therefore, as illustrated in FIG. 5, when the transfer film 5 is transferred to the design surface 10, in response that the pressing surface 40 is moved toward the design surface 10 to press the transfer film 6 against the design surface 10, the pressing surface 40 is elastically deformed by the reaction force received from the design surface 10 and pressured to the transfer film 6, and the transfer film 6 is pressed with relatively large pressing force against the design surface 10. In particular, the transfer film 6 is pressured hard against the design surface 10 at the first boundary part 11*a* side (that is, the parting groove 11*c* side) where the amount of the overlapping is large. Therefore, the transfer film 6 is transferred to the design surface 10 without unevenness (or substantially without unevenness). That is, as illustrated in FIG. 6, most part of the transfer layer 25 of the transfer film 6 moves from the film base material 60 to the design surface 10. Specifically, the adhesive layer 20, the decorative layer 2 and the transparent protective layer, and a part of the mold release layer are released from the film base material 60 and fixed on the design surface 10. In this time, since the three-dimensional transferring tool 4 is heated by the heater 51, at least a part of the adhesive layer 20 is softened and/or melted on the film base material 60. The base body 1 is in a lower temperature compared to the three-dimensional transferring tool 4, so that the adhesive layer 20 that has been cooled by the base body 1 is again solidified on the design surface 10 of the base body 1. Therefore, as illustrated in FIG. 6, the decorative layer 2 and the transparent protective layer (not shown) on the decorative layer 2 are fixed (adhered) on the design surface 10 of the base body 1 by the adhesive layer 20.

As illustrated in FIG. 3, the pressing complement surface 41 and a pressing general surface 44 adjacent to the pressing complement surface 41 are connected in a square manner. In other words, the boundary part 45 between the pressing complement surface 41 and the pressing general surface 44 form a corner. Therefore, when pressed by the three-dimensional transferring tool 4, the transfer layer 25 on the film base material 60 is pressed hard by the cornered boundary part 45. At this time, the shearing force by the boundary part 45 works on the transfer layer 25, so that the transfer layer 25 is divided at the boundary part 45 as the border. Therefore, the transfer layer 25 disposed in the pressing surface 40 and the pressing complement surface 41 side is transferred to the design surface 10, and the transfer layer 25 disposed in the pressing general surface 44 remains on the film base material 60. Further, since the boundary part 45 between the pressing complement surface 41 and the pressing general surface 44 faces the parting groove 11*c*, the end 26 of the transfer layer 25 is pushed into the parting groove 11*c* by the pressing complement surface 41 as illustrated in FIG. 6. Therefore, the design surface 10 on which the decorative layer 2 is laminated and the general surface 11 are partitioned, by the parting groove 11*c* with a good parting property (in other words, excellent visibility).

It is noted that a boundary part 47 of the pressing clearance surface 42 and the pressing surface 40 of the three-dimensional transferring tool 4 also forms a corner. Therefore, the transfer layer 25 transferred to the design surface 10 and the transfer layer 25 remaining on the film base material 60 are divided by the three-dimensional transferring tool 4 also at the second boundary part 11*b* side (that is, the inner circumference side of the design surface 10). Therefore, the decorative layer 2 is formed with a relatively good parting property also in the second boundary part 11*b* side.

According to the manufacturing method of the embodiment 1, the transfer film 6 is pressed against the design surface 10 by the three-dimensional transferring tool 4 made of the elastic body under the heated state, so that, the transfer film 6 can be substantially evenly extended along the three-dimensional design surface 10. Therefore, the decorative layer 2 transferred on the design surface 10 exhibits the excellent design with reduced wrinkle and crack. Further, the parting groove 11*c* having a recessed shape is provided at the border between the design surface 10 and the general surface 11 of the base body 1, so that the parting groove 11*c* functions as an eye catcher. Therefore, even if the end 26 of the decorative layer 2 is somehow irregular, it gives persons viewing the design member an impression, that it looks in order. That is, the design member of the embodiment 1 is superior in the parting property between the decorative layer 2 and the general surface 11.

Further, the boundary part 45 between the pressing complement surface 41 and the general surface 11 and the boundary part 47 between the pressing surface 40 and the pressing clearance surface 42 are formed in a square corner manner, so that the transfer layer 25 transferred to the design surface 10 and the transfer layer 25 remaining on the film base material 60 can be divided with high accuracy. Therefore, the end 26 of the decorative layer 2 on the design member can be formed substantially even, which allows for the improved parting property between the decorative layer 2 and the general surface 11.

Furthermore, the three-dimensional transferring tool 4 is formed rising upward in the moving direction and the end 26 of the decorative layer 2 is pushed into the parting groove 11*c* by the pressing complement surface 41, which makes it difficult for the end 26 to be exposed outside the parting groove 11*c*, so that the parting property between the decorative layer 2 and the general surface 11 can be further improved.

According to the manufacturing method of the embodiment 1, the cooperation by the above allows for the manufacturing of the design member superior in a design property.

Thus, when viewed from the upper side (the design surface 10 side) of the design member of the embodiment 1, the design surface 10 exhibits substantially even metallic luster, and the border between the design surface 10 and the general surface 11 is partitioned with a good parting property by the parting groove. That is, the design member of the embodiment 1 is superior an a design property.

By the way, the inside of the design member of the embodiment 1, that is, the retainer of the air conditioner register is provided with other members such as a blade for adjusting the wind direction. Therefore, the inner circumference surface side in the retainer is unlikely to be viewed. On the other hand, the outer circumference surface of the retainer is exposed. Therefore, the second boundary part 11*b* in the design member of the embodiment 1 is unlikely to be viewed and the first boundary part 11*a* is likely to be viewed. Therefore, in forming the decorative layer 2 on the design surface 10, the parting property between the decorative layer 2 and the first boundary part 11*a* affects significantly to the design of the design member, while the parting property between the decorative layer 2 and the second boundary part 11*b* affects little to the design of the design member. Therefore, in the manufacturing method of the embodiment 1, the parting groove 11*c* is provided to the first boundary part 11*a* only and the parting groove 11*c* is not provided to the second boundary part 11*b*. In the manufacturing method of the present invention, however, the parting groove 11*c* of the base body 1 may be provided according to the design required to the design member to be manufactured. That is, the parting groove 11*c* may be provided to the entire boundary part between the design surface 10 and the general surface 11 of the base body 1.

In the base body 1 used in the manufacturing method of the embodiment 1, the groove width of the parting groove 11*c* is approximately 0.3 mm to 3.0 mm, and the groove depth is approximately 0.5 mm to 2.0 mm. The preferable groove width of the parting groove 11*c* is approximately 0.3 mm to 1.0 mm, and the more preferable groove width is approximately 0.5 mm to 1.0 mm. It is noted that, if the groove width is excessively large or the groove depth is excessively small, the inside of the parting groove 11*c* is likely to be viewed, which may make it difficult to hide the end 26 of the decorative layer 2 by the parting groove 11*c*. Further, if the groove width is excessively small or the groove depth is excessively large, the forming property of the base body 1 is degenerated. It is thus preferable that the groove width and the groove depth are within the above range.

In the design member of the embodiment 1, while the decorative layer 2 is made of the metal layer, the decorative layer 2 in the manufacturing method of the present invention is not limited to it. The decorative layer 2 may be of a single layer and may be of multiple layers. For example, it may be the colored layer (single layer) exhibiting various colors, and may be the multiple layers in which the metal layer and the colored layer are laminated, and may be the single layer in which metal particles and. color pigment, are dispersed in the same layer. Further, the adhesive layer 20 and the protective layer as described above may be laminated on the decorative layer 2 if necessary, or may not be laminated. Other layer than the adhesive layer 20 and the protective layer may be further laminated on the decorative layer 2.

(Embodiment 2)

Figure 7:
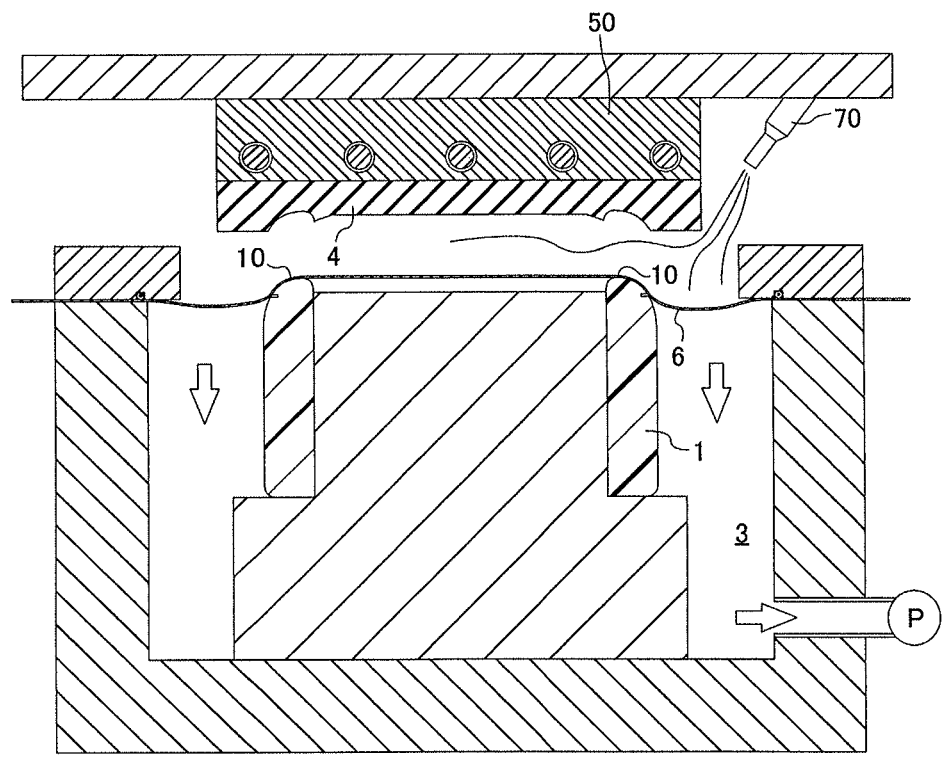
FIG. 7 is an explanatory diagram schematically illustrating a preparing process in the manufacturing method of the design member of an embodiment 2.

A manufacturing method of an embodiment 2 is the same as the manufacturing method of the embodiment 1 except that it has a pre-heating process after the preparing process and before the heat transferring process. FIG. 7 is an explanatory diagram schematically illustrating the manufacturing method of the embodiment 2.

As illustrated in FIG. 7, the manufacturing apparatus used in the embodiment 2 has pre-heating device 70 adapted to heat the transfer film 6 before the heat transferring process.

The pre-heating device 70 is a blower integrated into the base tool 50 and supplies hot blast into the chamber 3 from the upper part of the chamber 3.

In the pre-heating process, the hot blast from the pre-heating device 70 is blown against the transfer film 6 placed on one design surface 10 of the base body 1. Similarly to the manufacturing method of the embodiment 1, the inside of the chamber 3 is in the reduced pressure state by the decompressing pump 36. Therefore, at this time, while being crimped to the design surface 10, the transfer film 6 is preliminarily softened. The temperature for heating the transfer film 6 by the pre-heating device 70 is lower than the temperature at which the three-dimensional transferring tool 4 heats the transfer film 6 in the heat transferring process (approximately 80 degrees centigrade to 100 degrees centigrade). Therefore, the adhesive layer 20 does not come to be melted at this time and is softened only.

According to the manufacturing method of the embodiment 2, the transfer film 6 is softened and fitted along the design surface 10 by the pre-heating process, so that the transfer film 6 and the transfer layer 25 can be fitted along the design surface 10 more evenly, which allows for obtaining the design member that is further superior in a design property.

The manufacturing method of the design member of the present invention is a method for transferring the decorative layer onto the design surface of the base body having various shapes such as a plate shape, a ring shape, and so on, and can be used as the manufacturing method for providing a design with color, metallic luster, and the like onto the surface of various resin molded articles. Further, the three-dimensional transferring tool of the present invention can be used as a tool utilized for the manufacturing method of the design member of the present invention when manufacturing the above-described various products.

(Note) The present invention is not limited to the embodiments described above and illustrated in the drawings, and can be modified and implemented in an appropriate manner without departing the concept.

LIST OF THE REFERENCE NUMERALS

1: base body
2: decorative layer
4: three-dimensional transferring tool
6: transfer film
10: design surface
11: general surface
11*c*: parting groove
20: adhesive layer
25: transfer layer
35, 36: gas pressure adjusting device
36: decompressing pump
40: pressing surface
41: pressing complement surface
60: film base material
L1: tangent at the end of pressing surface

What is claimed is:

1. A manufacturing method of a design member for transferring a decorative layer, onto a design surface of a base body, the base body having the design surface that is a three-dimensional shape and a general surface that is a surface other than the design surface, and the manufacturing method including:

with using the base body comprising, in the general surface, a recessed parting groove that is formed in the base body in at least a part of a border between the general surface and the design surface, a preparing step for arranging the base body in a chamber having a gas pressure adjusting device, placing, on the design surface of the base body, a transfer film in which a transfer layer including an adhesion layer and the decorative layer is laminated on a film base material, and changing a gas pressure in the chamber by the gas pressure adjusting device to crimp the transfer film onto the design surface; and a heat transferring step for, with crimping the transfer film onto the design surface by the gas pressure adjusting device, pressing the transfer film against the design surface up to at least a part of the recessed parting groove under a heated state by a three-dimensional transferring tool comprising an elastic body.

2. The manufacturing method of the design member according to claim 1, wherein the three-dimensional transferring tool is able to move forward and backward with respect to the design surface of the base body and has a pressing surface facing the design surface, wherein a peripheral edge of the pressing surface is formed with a pressing complement surface continuing from the pressing surface and extending up to a position facing at least the part of the parting groove, and wherein the pressing complement surface rises toward a moving direction with respect to the design surface compared to a tangent at an end of the pressing surface.

3. The manufacturing method of the design member according to claim 1, wherein the gas pressure adjusting device includes a decompressing pump adapted to reduce a gas pressure in the chamber below an atmospheric pressure in the heat transferring step.

4. The manufacturing method of the design member according to claim 1, further comprising a pre-heating step for heating the transfer film after the preparing step and before the heat transferring step.

5. The manufacturing method of the design member according to claim 4, wherein a heating temperature in the pre-heating step is lower than a heating temperature in the heat transferring step.

6. The manufacturing method of the design member according to claim 2, wherein the gas pressure adjusting device includes a decompressing pump adapted to reduce a gas pressure in the chamber below an atmospheric pressure in the heat transferring step.

7. The manufacturing method of the design member according to claim 2, further comprising a pre-heating step for heating the transfer film after the preparing step and before the heat transferring step.

8. The manufacturing method of the design member according to claim 3, further comprising a pre-heating step for heating the transfer film after the preparing step and before the heat transferring step.

9. The manufacturing method of the design member according to claim 1, wherein the pressing presses an end of the transfer layer laminated on the film base material into the recessed parting groove.

10. The manufacturing method of the design member according to claim 1, the pressing of the transfer film further presses an end of the transfer layer laminated on the film base material into the recessed parting groove, and then after the pressing the end of the transfer layer laminated on the film base material is disposed in the recessed parting groove.

11. The manufacturing method of the design member according to claim 1, wherein the recessed parting groove has a concave shape.

12. The manufacturing method of the design member according to claim 1, wherein a groove width of the recessed parting groove is in a range between approximately 0.3 mm to 3.0 mm, and a groove depth of the recessed parting groove is in a range between approximately 0.5 mm to 2.0 mm.

13. The manufacturing method of the design member according to claim 1, wherein the decorative layer is made of a metal.

14. The manufacturing method of the design member according to claim 1, wherein the adhesion layer has, as a material, an acrylic adhesive agent.

15. The manufacturing method of the design member according to claim 1, wherein the transfer film placed on the design surface of the base body comprises, in this order, the film base material, the decorative layer, and the adhesion layer adjacent to the design surface of the base body.

* * * * *